US008532000B2

(12) United States Patent
Bottiero et al.

(10) Patent No.: US 8,532,000 B2
(45) Date of Patent: Sep. 10, 2013

(54) METHOD FOR ESTABLISHING A MULTIMEDIA SESSION WITH A REMOTE USER OF A COMMUNICATIONS NETWORK

(75) Inventors: Bruno Bottiero, Turin (IT); Andrea De Martin, Turin (IT); Alessandro Porta, Turin (IT); Andrea Varesio, Turin (IT)

(73) Assignee: Telecom Italia S.p.A., Milan (IT)

( * ) Notice: Subject to any disclaimer, the term of this patent is extended or adjusted under 35 U.S.C. 154(b) by 216 days.

(21) Appl. No.: 12/084,429

(22) PCT Filed: Nov. 3, 2005

(86) PCT No.: PCT/IT2005/000640
§ 371 (c)(1),
(2), (4) Date: Jan. 2, 2009

(87) PCT Pub. No.: WO2007/052315
PCT Pub. Date: May 10, 2007

(65) Prior Publication Data
US 2009/0268712 A1    Oct. 29, 2009

(51) Int. Cl.
*H04B 1/44* (2006.01)
(52) U.S. Cl.
USPC .......................................... 370/282; 709/227
(58) Field of Classification Search
USPC .......................................... 370/282; 709/227
See application file for complete search history.

(56) References Cited

U.S. PATENT DOCUMENTS

| 2002/0105943 | A1  | 8/2002 | Womack et al. |
| 2002/0133600 | A1* | 9/2002 | Williams et al. ............... 709/228 |
| 2003/0023690 | A1* | 1/2003 | Lohtia ............................. 709/206 |
| 2004/0125756 | A1* | 7/2004 | Lepore et al. .................. 370/261 |
| 2005/0038876 | A1* | 2/2005 | Chaudhuri ..................... 709/219 |
| 2006/0026649 | A1* | 2/2006 | Shieh ............................... 725/62 |

FOREIGN PATENT DOCUMENTS

| CN | 1455997 A | 11/2003 |
| EP | 0 762 704 B1 | 2/2004 |
| WO | WO 2005/027460 A1 | 3/2005 |

OTHER PUBLICATIONS

G. Camarillo, "The Early Session Disposition Type for the Session Initiation Protocol (SIP)," IETF Standard, Internet Engineering Task Force, Request for Comments: 3959, pp. 1-11 (Dec. 2004).
A. Goulart et al., "On Overlapping Resource Management and Call Setup Signaling: A New Signaling Approach for Internet Multimedia Applications," Computer Communications, vol. 28, pp. 851-863 (2005).
White Paper: "Video Sharing—Enrich Your Voice Call With Video," pp. 1-12, Nokia Corporation (2004).
White Paper: "IP Convergence Based on SIP—Enhanced Person-To-Person Communications," pp. 1-21, Nokia Corporation (2004).
Rosenberg et al.; "SIP: Session Initiation Protocol", IETF RFC 3261 (SIP standards), Network Working Group, Request for Comments: 3261, Obsoletes: 2543, Category: Standards Track, pp. 1-269, (2002).

* cited by examiner

*Primary Examiner* — Wei Zhao
(74) *Attorney, Agent, or Firm* — Finnegan, Henderson, Farabow, Garrett & Dunner, L.L.P.

(57) ABSTRACT

For establishing a multimedia session with a remote user's terminal, a terminal starts a signaling intended to establish the multimedia session addressed to the remote user's terminal. Predetermined acknowledgement messages indicate to the terminal and to the remote terminal that the multimedia session is established. The terminal and/or the remote terminal run at least a module of a multimedia application before reception of the predetermined acknowledgement messages.

12 Claims, 4 Drawing Sheets

METHOD FOR ESTABLISHING A MULTIMEDIA SESSION WITH A REMOTE USER OF A COMMUNICATIONS NETWORK

CROSS REFERENCE TO RELATED APPLICATION

This application is a national phase application based on PCT/IT2005/000640, filed Nov. 3, 2005, the content of which is incorporated herein by reference.

FIELD OF THE INVENTION

The present invention relates in general to the field of communications networks, and in particular to mobile communications networks. More particularly, the present invention relates to the establishment of multimedia sessions in communications networks, such as mobile communications networks.

BACKGROUND OF THE INVENTION

There is a strong interest in providing multimedia services to the users of communications networks, particularly mobile communications networks. By "multimedia service" it is generally intended a service in which a plurality of media can be used for supporting and/or performing the communication, such as, for example, voice, text, images, video, access to data (e.g. through the Internet and/or an electronic mailbox), generic files. Among these services, the so-called "combinational services" are attracting great attention of the mobile telephony operators. For the purposes of the present description, by "combinational service" it is generally intended a service through which a terminal of a (not necessarily mobile) communications network can simultaneously open and use two connections, typically a circuit (circuit-switched or CS) connection and a packet (packet-switched, PS) connection.

For example, a description of a service enjoyable through mobile terminals is given in the White Paper "Video sharing—Enrich your voice call with video", by Nokia Corporation, publicly available for download at the Internet site:
http://www.nokia.com/BaseProject/Sites/NOKIA_ MAIN_18022/CDA/Categories/Phones/Technologies/ VideoSharing/_Content/_Static_Files/video_sharing_ a4_2510.pdf The real time video sharing service described in this White Paper allows the users, during a telephone conversation, to easily enrich their communication. One or the other of the users can share a live video taken by a video camera or video clips from the terminal. Both the users see the same video and can discuss about it while they are continuing their voice call.

In another White Paper, entitled "White Paper: IP Convergence Based On SIP: Enhanced Person-To-Person Communications", publicly made available by Forum Nokia for download at the Internet site
http://www.forum.nokia.com/main/1,040,00.html?fsr- Param=2-3-/main.html&fileID=5336
the use of the SIP protocol is described for the establishment of connections between terminals capable of supporting the IP protocol. As described in the White Paper, in order to communicate, IP-based applications must have a mechanism to reach the correspondent. Today, fixed and mobile telephony networks perform this critical task of establishing a connection. By dialing the other user's telephone number, the network can establish an ad-hoc connection between any two terminals. This critical connectivity capability still does not exist widely in the Internet. According to this White Paper, SIP-based sessions management, complemented by other critical mobile networks capabilities (i.e., authentication, roaming, and network interconnection provided by the IMS standard) provides the required structure. With the implementation of such a system, it is possible to establish an IP connection between two terminals. Once the connection is established, it can be used to exchange all types of communication media (voice, video, content, etc.). Like HTTP, SIP is a text-based client-server protocol. SIP was designed to establish, modify and terminate multimedia sessions or calls, and it differs from the HTTP in the fact that a "SIP terminal" (or User Agent, UA) may act as both a client and a server. Therefore it is possible to establish a client-to-client communication.

PCT patent application no. WO 2005/027460 discloses a method of establishing a combinational multimedia session between at least two end user terminals, the method comprising: discovering at each end user terminal the end user authorization to use the multimedia service; subsequently establishing a circuit switched connection between the end user terminals via one or more telecommunication networks; upon successful discovery of end user authorization to use the multimedia service and prior to or following the establishment of said circuit switched connection, discovering at each end user terminal the multimedia capabilities of the or each other terminal; and whilst the circuit switched connection is established, establishing an IP multimedia subsystem session between the end user terminals via one or more IP multimedia subsystem networks, and transferring IP multimedia information between the user terminals, said multimedia information relating to a service supported by both or all user terminals.

As also explained in the above mentioned PCT patent application, IP Multimedia Subsystem (IMS) is the technology defined by the Third Generation Partnership Project (3GPP) to provide IP multimedia services over 3G mobile communication networks. IMS provides key features to enrich the end-user person-to-person communication experience through the integration and interaction of services. IMS allows new rich person-to-person (client-to-client) as well as person-to-content (client-to-server) communications over an IP-based network (not necessarily mobile, or only mobile). The IMS makes use of the SIP protocol to set up and control calls or sessions between user terminals (or user terminals and servers, such as web servers).

SUMMARY OF THE INVENTION

A problem tackled by the Applicant is that the establishment of a multimedia session, for example a session based on the IMS infrastructure and on the SIP protocol for a video sharing service, may take several seconds. In particular, with exemplary reference to a multimedia session including a voice and a video component, the time elapsing between the instant in which the first user "invites" the second user to the multimedia session and the instant in which the second user sees the first video frame of the video sent by the first user on its terminal' screen may be quite long. This can cause a bad impression to the users, with reference to the quality of the given service.

The Applicant has observed that the overall time needed for establishing a multimedia session can be split in two main "categories": a first category groups the time intervals needed to the completion of all the signaling messages needed for the setup of the session; a second category groups the time intervals needed for properly running and configuring the multimedia application software (e.g. a multimedia player) needed for rendering the exchanged content at the user's terminals.

Once the network infrastructure has been set up and configured, the overall time grouping the time intervals of the first category cannot be reduced beyond a certain limit, since the number and the type of signaling messages needed to the setup of the session are typically defined in standards, so as to reduce the impact of interoperability issues between different operators and/or technologies. In turn, the time intervals of the second category cannot be easily reduced, since the running and the configuration of the multimedia application software typically depends on the terminal's features (processing unit speed, memory, etc.) that cannot be easily changed.

Notwithstanding the above, the Applicant has found that it is still possible to substantially reduce the time for establishing a multimedia session between two users of a communications network by providing that at least part of the running and/or of the configuration of the multimedia application software occurs during the time interval spent for the exchange of the signaling messages needed for the establishment of the multimedia session. In other words, at least part of the multimedia application software can be run before the completion of the establishment of the multimedia session, so that the user's terminals can be essentially ready to the use of the multimedia service as soon as the completion of the establishment of the multimedia session occurs, substantially without any further delay. Preferred embodiments of the invention may provide that the running of at least part of the application software is triggered, at the originating user's terminal, by the starting of the first signaling devoted to the establishment of the multimedia session with the remote user's terminal. Furthermore, preferred embodiments of the invention may provide that the running of at least part of the application software is triggered, at the receiving user's terminal, by the receiving of the first signaling devoted to the establishment of the multimedia session with the originating user's terminal.

According to a first aspect the invention relates to a method for establishing a multimedia session with a remote user of a communications network, the method comprising:

starting a signaling intended to establish the multimedia session with a terminal of the remote user;

receiving a predetermined acknowledgement indicative of an establishment of the multimedia session;

running at least one module of a multimedia application before reception of said predetermined acknowledgement.

In preferred embodiments of the present invention, said signaling is addressed to the remote user, and preferably, the running of said at least one module of said multimedia application is performed after the starting of said signaling. More preferably, the running of said at least one module of said multimedia application is performed based on the starting of said signaling.

In other preferred embodiments of the present invention, the running of said at least one module of said multimedia application is performed in background; preferably, said multimedia application comprises a multimedia engine and a multimedia console; and the running of said at least one module of said multimedia application comprises running said multimedia engine. More preferably, the receiving of said predetermined acknowledgement comprises receiving a positive acknowledgement of the establishment of the multimedia session, and the method comprises running in foreground said multimedia console after reception of said positive acknowledgement. Even more preferably, the running in foreground of said multimedia console is performed based on the reception of said positive acknowledgement.

In still other preferred embodiments of the present invention, the signaling intended to establish the multimedia session comprises a capability exchange signaling adapted to assess at least one media capability of the terminal of the remote user, or preferably, the signaling intended to establish the multimedia session comprises an inviting signaling adapted to invite the terminal of the remote user to the multimedia session.

In certain embodiments of the present invention, the method further comprises placing a call to the terminal of the remote user. More preferably, the method further comprises:

receiving an acknowledgement to said call; and establishing a connection on a packet-switched domain of said communications network based on the reception of the call acknowledgement.

Even more preferably, the starting of the signaling intended to establish the multimedia session is performed on the established packet-switched connection.

According to a second aspect, the invention relates to a method for establishing a multimedia session with a remote user of a communications network, the method comprising:

receiving a signaling intended to establish the multimedia session with a terminal of the remote user;

receiving a predetermined acknowledgement indicative of an establishment of the multimedia session;

running at least one module of a multimedia application before reception of said predetermined acknowledgement.

In preferred embodiments of the present invention, said signaling is originated from the remote user, and preferably, the running of said at least one module of said multimedia application is performed after the reception of said signaling. More preferably, the running of said at least one module of said multimedia application is performed based on the reception of said signaling.

In other preferred embodiments of the present invention, the running of said at least one module of said multimedia application is performed in background, and preferably, said multimedia application comprises a multimedia engine and a multimedia console, and wherein the running of said at least one module of said multimedia application comprises running said multimedia engine. More preferably, the receiving of said predetermined acknowledgement comprises receiving a positive acknowledgement of the establishment of the multimedia session and wherein the method comprises running in foreground said multimedia console after reception of said positive acknowledgement. Even more preferably, the running in foreground of said multimedia console is performed based on the reception of said positive acknowledgement.

In still other preferred embodiments of the present invention, the signaling intended to establish the multimedia session comprises a capability exchange signaling adapted to assess at least one media capability of a terminal receiving said signaling, and preferably, the signaling intended to establish the multimedia session comprises an inviting signaling adapted to invite the terminal receiving the inviting signaling to the multimedia session.

In preferred embodiments, the method further comprises receiving a call from the terminal of the remote user. More preferably, the method further comprises:

answering to said call; and establishing a connection on a packet-switched domain of said communications network based on the answering of said call.

In other preferred embodiments of the present invention, the starting of the signaling intended to establish the multimedia session is performed on the established packet-switched connection.

According to a third aspect, the invention relates to an application adapted to manage an establishment of a multimedia session with a remote user of a communications network, the application being adapted to be run on a terminal adapted to be used in the communications network, wherein the application comprises software code portions adapted to perform the steps of the method of the first and/or of the second aspect, when run on said terminal.

According to a fourth aspect, the invention relates to a terminal adapted to be used in a communications network, wherein the terminal comprises the application of the third aspect.

In preferred embodiments of the present invention, the terminal is a mobile phone.

BRIEF DESCRIPTION OF THE DRAWINGS

Further features and advantages of the present invention will be made apparent by the following detailed description of some embodiments thereof, provided merely by way of non-limitative examples, description that will be carried out making reference to the attached drawings, wherein.

DETAILED DESCRIPTION OF PREFERRED EMBODIMENTS OF THE INVENTION

In the following detailed description reference will be made to a mobile communications network as a network being capable of supporting the establishment of multimedia sessions according to the invention. It is observed that the reference to a mobile communications network is made for exemplary purposes only, and has not to be considered as limiting the scope of the invention, that can be applied to any kind of communications network. In particular, multimedia sessions according to the invention can be established between users having terminals connected to different networks, such as a mobile network and a fixed network (e.g. a Digital Subscriber Line, or xDSL).

Furthermore, in the following detailed description reference will be made to a combinational video sharing service, in which a first connection is established in a circuit-switched domain of the communications network and a second, parallel, connection is established in a packet-switched domain between two users. In particular, the connection in the packet-switched domain is used for sharing still images or videos, taken in real-time or from a repository, whereas the circuit-switched connection is used for voice communication. It is observed that the video sharing service according to the following description is disclosed for exemplary purposes only, and that the invention finds application in many different kinds of services, in which multimedia content can be exchanged between two users of a communications network, even (but not necessarily) on a single user-to-user connection. Typically, multimedia content can be exchanged by exploiting sessions established at least on a packet-switched domain of the network, since often a circuit-switched domain does not offer sufficient available bandwidth for the exchange of multimedia content.

For the purposes of the present invention, the expression "multimedia session" identifies a session in which multimedia content can be exchanged. By "multimedia content" it is herein intended a content that uses a plurality of (i.e., at least two) different media, such as, for example, voice, text, images, video, generic data or files (e.g. accessed through the Internet and/or an electronic mailbox). The multimedia session relies upon at least one connection established in the communications network. For example, a video sharing service according to the above allows establishing of multimedia sessions in which voice communication is performed on a circuit-switched connection and video communication is performed on a packet-switched connection.

Figure 1:
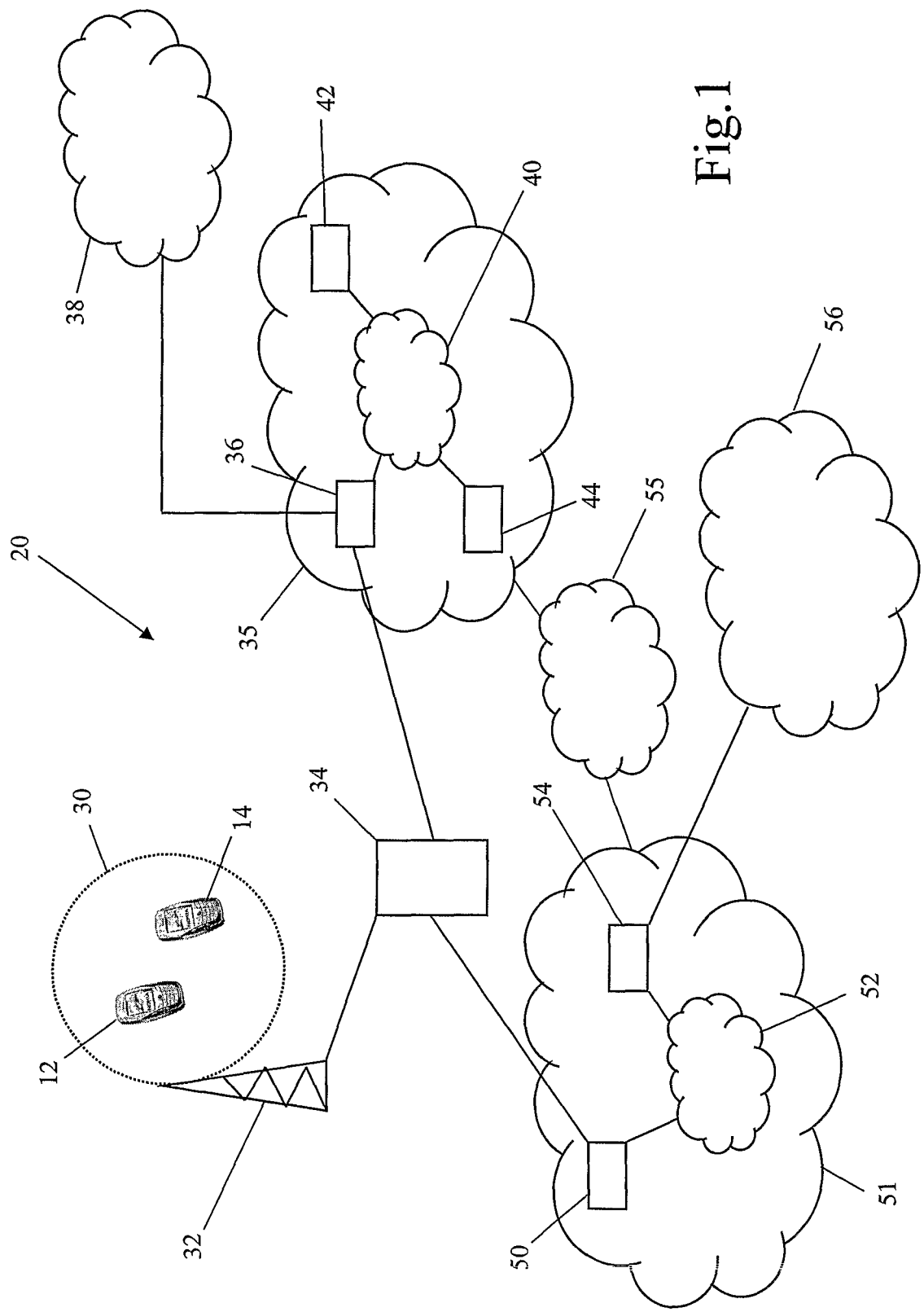
FIG. 1 shows, by way of example, a mobile communication network capable of supporting multimedia sessions.

FIG. 1 shows an example of mobile communication network 20 capable of providing mobile telephony services according to the GSM/GPRS standard. It is observed that a mobile network capable of providing mobile telephony services according to the UMTS standard has a structure very similar to the mobile network shown in FIG. 1. The mobile network 20 supports both communications on circuit-switched connections, and communications on packet-switched connections. To such end, the mobile network 20 includes a circuit-switched network portion (or domain) 35 and a packet-switched network portion (or domain) 51. Mobile terminals 12, 14 (for instance cellular phones, PDAs or Personal Digital Assistants, etc.) communicate on a radio interface with one or more radio base stations (BTS, Base Transmitter Station) 32. Every radio base station 32 provides mobile telephony services in a correspondent geographical area 30 commonly known under the name of "cell". It has to be understood that the mobile network 20 provides services to a number of cells and to a number of mobile terminals much higher than those shown by way of example in FIG. 1. Different radio base stations 32 are connected to a Base Station Controller (BSC) 34, that manages the allocation and the de-allocation of the radio resources and controls handover and/or cell re-selection of the mobile terminals in the passage from a radio base station to another. A BSC and his associated radio base stations are typically referred to as a Base Station Subsystem (BSS). The BSC 34 is connected to a Mobile Switching Center (MSC) 36 in the circuit domain 35, through which the circuit connections can also be established toward other networks 38, such as for instance PSTN or ISDN (Integrated Services Digital Network) networks. Typically, in capillary mobile networks, a plurality of BSCs like the BSC 34 shown in FIG. 1, are connected to a single MSC. In an UMTS context, the BSC is generally termed RNC (Radio Network Controller) and the BTS is generally termed node-B. However, for the purposes of the present description the expressions represented by the acronyms BSC and RNC can be considered as being totally equivalent, as well as the expression represented by BTS and the term node-B.

The MSC 36 is also connected, through a signaling network 40 (for instance a signaling network according to the Signaling System No. 7 or SS7) to a Home Location Register (HLR) 42, and to a Visitor Location Register (VLR) 44. The VLR 44 include a database containing information related to all the mobile terminals instantly present in a correspondent geographical area, as well as it holds temporary registration data of subscribers of the mobile telephony service, necessary to the MSC to provide services in such geographical area. The HLR 42 includes a database that stores and manages the subscriptions of the users of the mobile network 20, such as for instance the users to which the mobile terminals 12, 14 belong. For every subscriber thereof, the HLR contains permanent subscription data, such as for instance the telephone number (Mobile Station ISDN or MSISDN), also known as Client Line Identifier (CLI), that identifies the subscription of the mobile terminal in the numeration plan of the PSTN network, and an international mobile subscriber identifier (IMSI), i.e. an unique identifier at the international level allocated to every subscriber and used for the signaling in the circuit domain of the mobile networks. The HLR 42 additionally contains a list of services that a subscriber of a mobile network is authorized to use (in a so-called "profile"), and the address of the VLR that is instantly serving such subscriber.

Every BSC 34 is also connected to the packet-switched domain, corresponding to the GPRS network 51 in FIG. 1, to a Serving GPRS Support Node (SGSN) 50, which is responsible of the delivery of the packets to the mobile terminals that are located in its service area. In capillary mobile networks, a plurality of BSCs is connected to a single SGSN. A Gateway GPRS Support Node (GGSN) 54 acts as logical interface toward external packet networks, such as for instance the IP network 56 (for example, the Internet). The nodes SGSN 50 and GGSN 54 are typically connected to each other by an IP backbone 52. While no "native" signaling is provided in the packet-switched domain 51, known packet protocols (e.g. UDP, TCP, HTTP) can be exploited for defining a signaling protocol also in the packet-switched domain 51, and/or known application level signalings (e.g. SIP) can be provided.

Reference number 55 denotes an IMS (IP Multimedia Subsystem) network infrastructure, known to those skilled in the art and not shown in detail. IMS network infrastructure 55 mainly interacts with the packet-switched domain 51 but also has gateways for communicating with equipment being part of the circuit-switched domain 35.

The mobile communication network 20 of FIG. 1 may be part of a wider communication network, that involves external circuit-switched networks (exemplified by the network 38), and external packet-switched networks (exemplified by the network 56). The users of the mobile communication network 20 can communicate with users belonging to the external network 38 on a circuit-switched connection, as well as be connected to a web site or to their own electronic mail server in the IP network 56 on a packet-switched connection. Additionally, the users of the mobile communication network 20 can use at least one combinational service, i.e. a service thanks to which a user, for instance the user to which the mobile terminal 12 of FIG. 2 belongs, can simultaneously open, from his/her own mobile terminal 12, a circuit-switched connection and a packet-switched connection towards another user (of the mobile network 20 or of the external network 38). For example, the user can send a series of still images or a video (a recorded clip or a video taken in real time through an embedded videocamera) from his/her own mobile terminal 12 to the terminal of his/her own interlocutor, exploiting the packet-switched connection, and at the same time comment together with his/her own interlocutor the images that appear on both terminals. For the purposes of the present description, it will be intended in the following that the term "video" is meant to include whatever type of image, both still and in movement, taken in real time or recorded and stored in a repository, such as a memory area.

Figure 2:
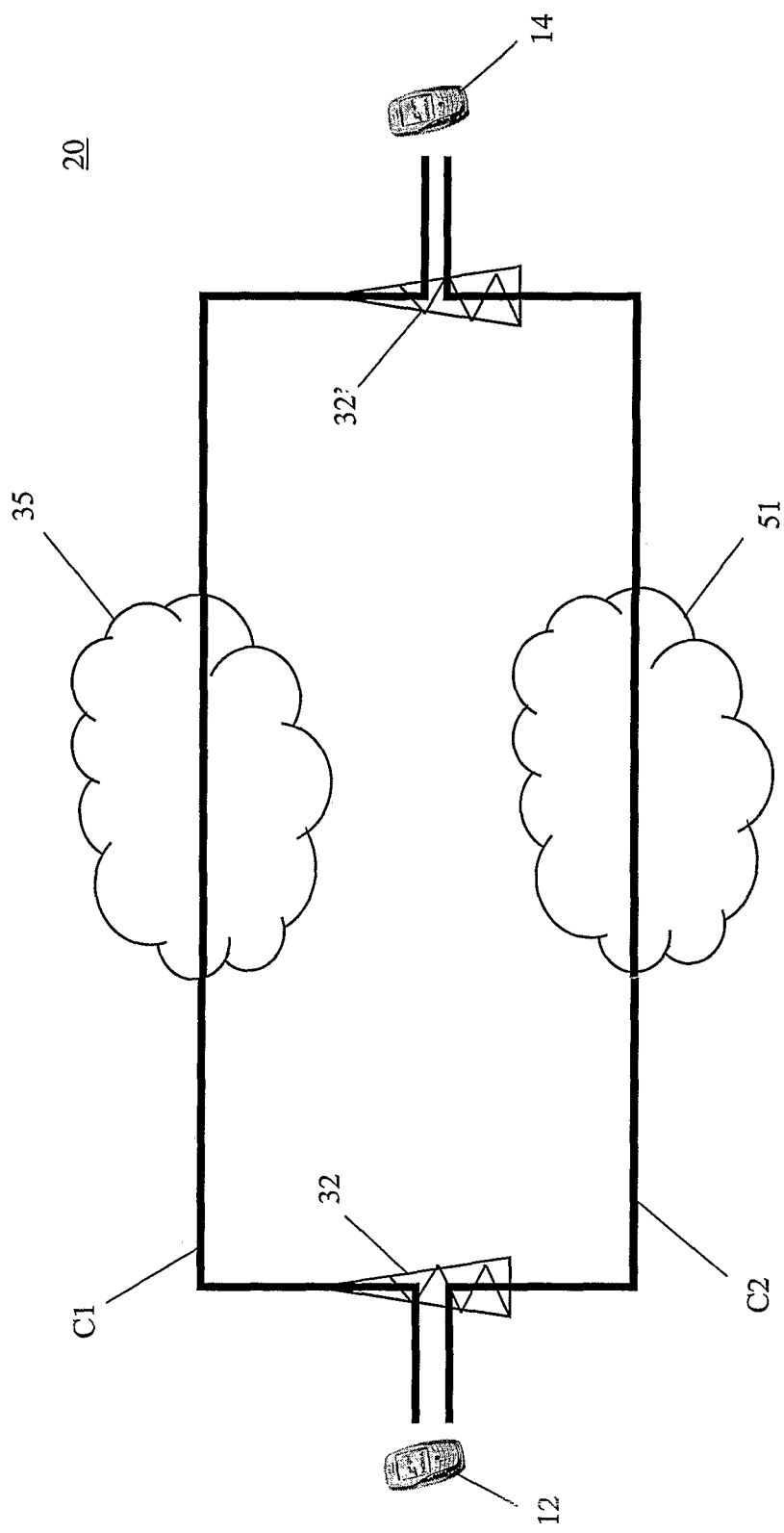
FIG. 2 shows in schematic way the enjoyment of a combinational service by two users of a mobile communication network.

For instance, with reference to FIG. 2, a first user of the mobile network 20, owning the mobile terminal 12, places a call towards a second user of the mobile network 20, owning the mobile terminal 14. The first mobile terminal 12 is served by a BTS 32 and the second mobile terminal 14 is served by a BTS 32', which can be the same one that is serving the first mobile terminal 32 or a different one. A first connection C1 is established, at the acceptance of the call by the second user, to support the voice communication between the first and the second users. The connection C1 is typically established, in bidirectional way, in the circuit-switched domain 35 of the mobile network 20. A second connection C2 is established between the mobile terminal 12 and the mobile terminal 14, in the packet-switched domain 51 of the mobile network 20, to allow the first and the second user share some video during their telephone conversation. The connection C2 can be used in unidirectional or bidirectional way: higher bit-rates can be achieved on connections used as unidirectional connections. Known technologies can be exploited for allowing the mobile terminals 12, 14 simultaneously maintain the two connections C1 and C2 active: for instance, the multi-RAB (Radio Access Bearer) technology for UMTS mobile terminals/networks, and the DTM technology for GSM/GPRS mobile terminals/networks.

Figure 3:
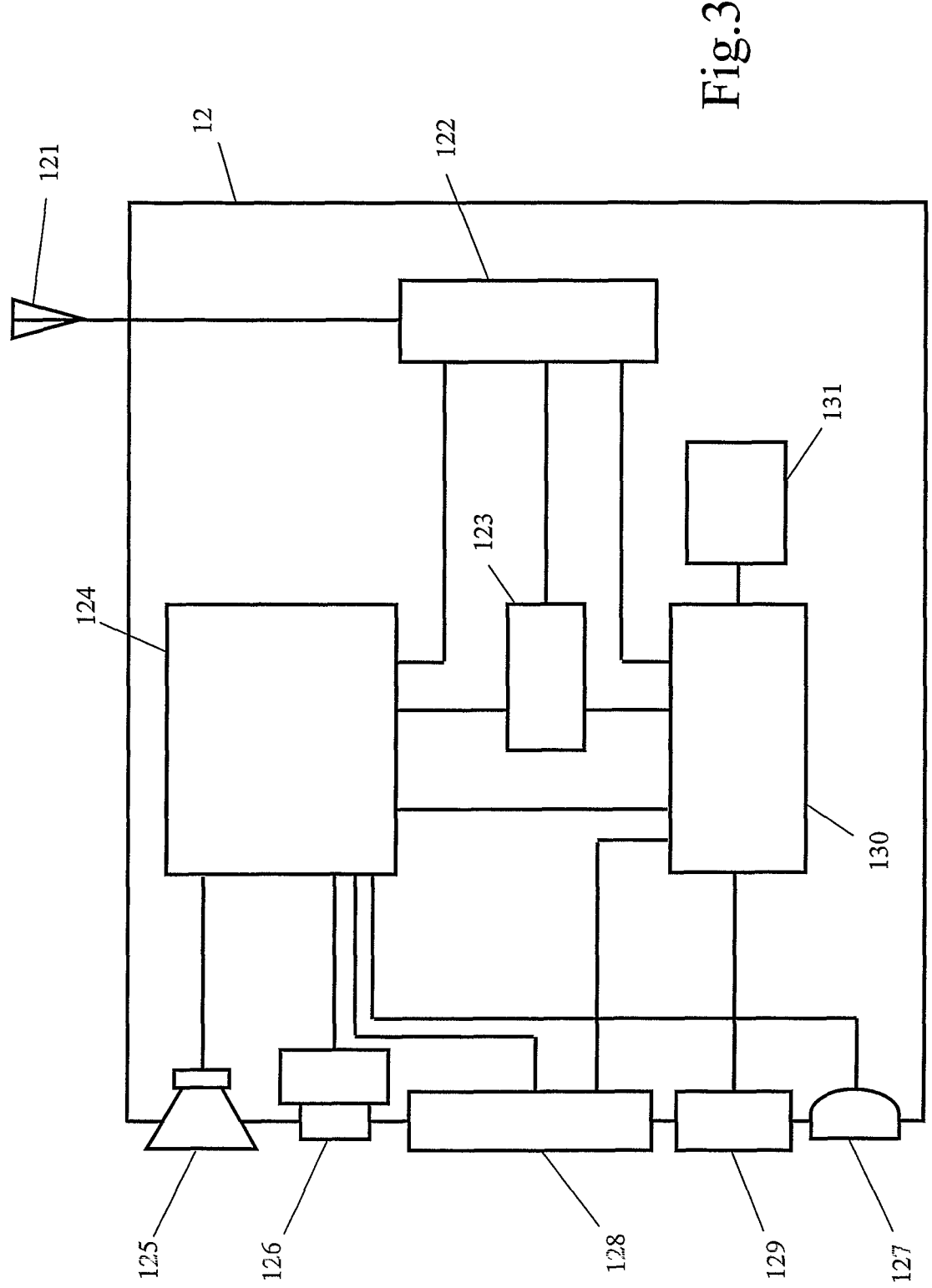
FIG. 3 shows in schematic way and in terms of functional blocks an example of a mobile terminal capable of establishing multimedia sessions.

FIG. 3 shows, in schematic way and in terms of functional blocks, an example of mobile terminal 12 capable of using a combinational service. The mobile terminal 12 comprises an antenna 121 adapted to the transmission/reception, a radio-frequency transceiver 122, a GPRS module 123, an encoding/decoding unit 124, a loudspeaker 125, a video camera 126, a microphone 127, a screen 128, a keyboard 129, a processor (or CPU, Central Processing Unit) 130 with a memory 131 associated therewith. The mobile terminal 12 is typically associated with a SIM (Subscriber Identity Module), not shown in FIG. 3, through suitable electrical contacts.

The antenna 121 and the radio-frequency transceiver 122 conventionally allow the communication from and towards the radio base stations of the mobile network. The loudspeaker 125 and the microphone 127 conventionally transform an electrical signal corresponding to the voice in a signal audible by a user of the mobile terminal 12, and vice versa. The keyboard 129 conventionally allows the user to manually interact with the mobile terminal, to send commands related, for instance, to choosing a menu option, or to the selection of a telephone number, etc. The screen 128 can be, for instance, a liquid crystal screen (LCD, Liquid Crystal Display), and it is conventionally adapted to show a video. The video camera 126, for instance a CCD (Charge-Coupled Device) camera, is conventionally adapted to capture a video or a still image. The GPRS module 123 conventionally includes a packetizing/depacketizing device and a buffer, and it is capable of encapsulating in packets the radio blocks coming from the mobile network, or to unpack in radio blocks the packets provided by the upper protocol layers, for the transmission toward the mobile network, through the radio-frequency transceiver 122 and the antenna 121. The encoding/decoding unit 124 (for instance an H.263 video codec) is connected to the loudspeaker 125, to the microphone 127, to the display 128 and to the video camera 126: it conventionally manages the coding/decoding of the video captured by the video camera 126 or to be displayed on the screen 128, and/or the audio component captured by the microphone 127 or to be transmitted to the loudspeaker 125. The processor 130 supervisions the operation and the activities of the different modules included in the mobile terminal 12. The memory 131, in combination with the processor 130, includes at least one software application for managing the communication with the communications network and/or with other users of the communications network. It is observed that despite in FIG. 3 different units are represented by separate entities with respect to the memory 131, at least some of the shown units can be realized by means of software programs performing the same function and being stored in the memory 131. For example, the encoding/decoding unit 124 and/or the GPRS module 123 are shown a separate entity, but can also be realized by means of software program resident in the memory 131 of the mobile terminal 12.

The above mentioned at least one software application for managing the communication included in the memory 131 comprises software for the control and/or the management of a multimedia session, such as, for example, of a combinational video sharing service. In particular, the at least one software application for the control and/or the management of the multimedia session controls and/or manages signaling needed for the establishment of the multimedia session, typically organized according to a predetermined operative flow. Such software application(s) can be automatically started at the mobile terminal start-up, so as to remain in background during the period in which the mobile terminal is switched-on, and to "wake up" when a multimedia session should be initiated. It can however be provided that the user could disable the automatic start of the application(s), or that the application(s) is manually run by the user. The software application for controlling and/or managing the multimedia session typically interacts with a (software or hardware) module adapted for handling signaling messages to be used for the establishment of the session. For example, such module can be a software stack included in the memory 131 adapted for handling SIP messages, i.e. for preparing requests and/or parsing responses according to the SIP standards (e.g. IETF RFC 3261).

Furthermore, the memory 131 includes multimedia application software (e.g. a multimedia player) for the control, management and/or reproduction of multimedia content, such as the multimedia content exchangeable between the user of the mobile terminal 12 and a remote user. The term "multimedia application software", or more simply "multimedia application", includes software (e.g. libraries, and/or scripts, and/or initialization files, etc.) adapted to control the multimedia resources of the mobile terminal 12 (e.g. the coding/decoding unit 124, and/or the loudspeaker 125, and/or the video camera 126, and/or the microphone 127, and/or the display 128, and/or the keyboard 129), as well as software adapted to manage the reproduction of the multimedia content to the user, i.e. the actual enjoyment of the multimedia content by the user (e.g. screen presentation, size, position, controls made available to the user, etc.). Typically, the latter software may comprise a user interface for allowing (at least minimum) interaction with the reproduced content by the user. The present invention can be carried out either in case a single multimedia software object or application performs both the control of the multimedia resources of the mobile terminal and the reproduction of the content, or in case separate modules are provided for controlling the multimedia resources of the mobile terminal 12 and for the reproduction of the content. In the latter case, the module (or modules) configured for controlling the multimedia resources of the mobile terminal 12 will be referred to as "multimedia engine", whereas the module (or modules) adapted for reproducing the multimedia content will be referred to as "multimedia consolle". The term "multimedia consolle" encompasses a user interface (typically a Graphical User Interface, or GUI), for possibly allowing the setting of some parameters of the reproduced content by a user (e.g. audio volume, screen size, zoom setting, etc.). Further to the reproduction of a content to be played, the multimedia consolle may allow the acquisition (and possibly the storing) of a content, e.g. the recording of a video or of a still image, by a user. The multimedia consolle typically cooperates with the multimedia engine through a suitable interface, in order to pass to the multimedia engine all the necessary information related to the settings of the content to be reproduced, possibly including information related to settings performed by a user, to allow the multimedia engine to suitably prepare the content to be reproduced. In particular, the multimedia engine may perform at least one of the following operations: video (or generally data) acquisition, coding and/or decoding, packetising and/or de-packetising, control of the rendering of the content (according to the settings possibly received by the multimedia consolle), synchronization between an audio and a video component, synchronization of a content to be rendered to a user according to a predetermined timeline. In preferred embodiments, the multimedia engine can comprise a set of modular software elements (e.g. Dynamic Load Libraries, or DLLs), each performing a controlling function of one or more multimedia resources of the terminal.

It is observed that the above mentioned software applications (either one of the application(s) for controlling/managing the multimedia session and the application(s) for controlling/managing/reproducing the multimedia content) can be implemented in the mobile terminal 12 as client applications that can be installed on the operating system of the mobile terminal 12 (in the internal mobile terminal's memory, or, less preferably, in an external memory accessible by the mobile terminal), or "cabled" in the firmware of the mobile terminal 12.

In preferred embodiments, the software application for controlling/managing the multimedia session is adapted to intercept and/or recognize the signalings of events related to calls performed from and/or toward the mobile terminal. Particularly, the application may be able to intercept and/or recognize:

a signaling related to an incoming call established in the circuit-switched domain; and/or a signaling related to an established outgoing call performed in the circuit-switched domain; and/or a signaling related to the interruption of an ongoing call in the circuit-switched domain, locally performed; and/or a signaling related to the interruption of an ongoing call in the circuit-switched domain, remotely performed.

It is observed that the last two cases listed above also include the possibility that the call is terminated in case the mobile terminal (or a remote mobile terminal) happens to be out of radio coverage during the call. Moreover, it is observed that the cases listed above do not constitute an exhaustive list of possible events that the software application can intercept or recognize.

In the preferred embodiments, in case the user owning the mobile terminal desires to make a call toward another user (belonging to the same mobile network or to a different, fixed or mobile network), the software application for managing/controlling multimedia sessions does not intervene during the conventional selection of the telephone number of the user to call (typically performed through the keyboard or selected from a telephone directory stored in the mobile terminal, or in the SIM associated thereto). The calling user can start the call toward his/her own interlocutor in an entirely conventional way, typically pressing a suitable key on the keyboard of the mobile terminal. The call is conventionally routed on the circuit-switched domain of the network.

At the answer of the called user, a connection is established between the mobile terminal of the calling user and the terminal of the called user in the circuit-switched domain of the communications network. At the establishment of such connection, an acknowledgment is sent to the mobile terminal of the calling user, which enables the calling user to use the connection just established for communicating with his/her own interlocutor. The software application for managing/controlling multimedia sessions running on the terminal of the calling user intercepts such an acknowledgment signaling and triggers the starting of a connection procedure to the packet-switched domain of the mobile network. The starting of the packet-switched connection procedure can advantageously be performed automatically (i.e., without interaction of the user with the terminal). Typically, the procedure provides for a connection from the terminal to an access point (APN, Access Point Name) of the packet-switched domain. The connection procedure provides that the GGSN 54 signals to the APN, typically through the RADIUS protocol, the telephone number of the terminal that is requesting the connection. The APN associates to the telephone number a unique address on the packet-switched domain (typically an IP address), after having checked its credentials, and communicates the same to the GGSN 54, which in turn forwards the same toward the terminal that has requested the connection. The APN also keeps the association between the telephone number of the mobile terminal (or the identifier of the mobile terminal in the circuit-switched domain) and the assigned IP address (or the address/identifier of the mobile terminal in the packet-switched domain), in a suitable database. Such an association can also be communicated to other apparatuses in the network, such as for instance a WAP Gateway. The connection to the packet-switched domain is typically completed with the opening of a so-called PDP context from the mobile terminal towards a GGSN of the GPRS network core of the mobile network.

Similarly, at the establishment of the circuit-switched connection, an acknowledgment is also sent to the mobile terminal of the called user. The software application for managing multimedia sessions running on the terminal of the called user intercepts such an acknowledgment signaling and triggers the starting of a connection procedure to the packet-switched domain of the mobile network, in a similar manner to what disclosed above with reference to the calling user's terminal.

In embodiments alternative to those presented above, it may be provided that the opening of a PDP context is performed manually by the calling and/or the called user, or that a PDP context is already active at the time in which the call is placed (e.g. a PDP context is activated at the terminal switch-on) at the calling and/or called user's terminal.

Once also the connections to the packet-switched domain have been established, the calling user and the called user have available a circuit-switched connection to conventionally communicate by voice with each other, and a packet-switched connection to share data. However, in order to share data a "direct" connection or session should preferably be established between the two user's terminals on the packet-switched domain. The establishment of the direct connection between the two users can be initiated by either one of the two users, for example by pressing a suitable key (or softkey) on the respective terminal, the key (or softkey) being labeled as or corresponding to a video or data sharing service. The application for managing multimedia sessions can thus initiate a signaling intended to establish a connection towards the remote user on the packet-switched domain. Typically, a peer-to-peer connection is established between the terminals of the two users: in order to establish the peer-to-peer connection, the terminals of the two users exchange their own addresses/identifiers on the packet-switched domain (typically their IP addresses).

Figure 4:
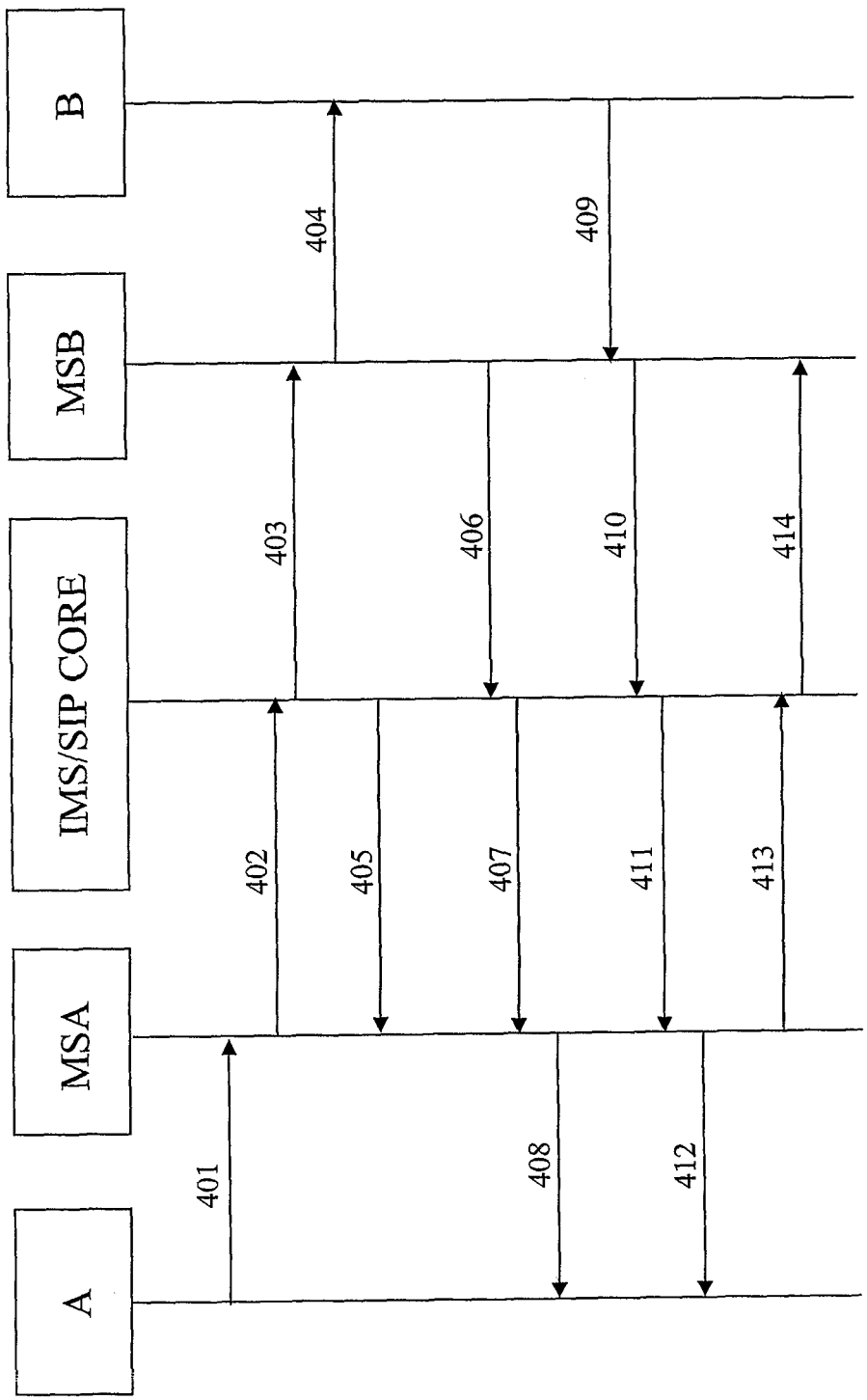
FIG. 4 shows a typical flow of signaling messages adapted for allowing establishing of a peer-to-peer session on the packet-switched domain between two user's terminals.

FIG. 4 shows one flow embodiment of signaling messages adapted for allowing establishing of a peer-to-peer session on the packet-switched domain between a user A, owning a respective terminal MSA, and a user B, owning a respective terminal MSB. In particular, the exemplary flow shown in FIG. 4 is compliant with the above mentioned IETF RFC 3261 and uses signaling messages according to the SIP protocol. It is Intended that the packet-switched domain of the communications network comprises or interacts with an IMS infrastructure. For the purposes of this description it is not necessary to specify all the elements of the packet-switched network and of the IMS infrastructure involved by the signaling flow, so that the overall network infrastructure has been condensed in a single functional block named "IMS/SIP core", grouping all the elements and/or functions of the IMS infrastructure involved by the SIP signaling. It is further intended that user A and user B have at their disposal an identifier of the respective interlocutor (e.g. because they are already involved in a voice communication over an already established circuit-switched session, or because a respective entry is included in a directory of the terminals), to be used for the addressing of the SIP signaling messages.

The starting of the signaling flow may be typically triggered by an action on the respective terminal by one of the two users, the action corresponding to the beginning of the share video session. For example, user A may initiate video sharing with user B by pressing a suitable key (or softkey) on his/her terminal MSA (401). This action triggers the sending of a SIP INVITE signaling message (402) addressed to user B (e.g. using a SIP URI as identifier of user B), including at least a sender identifier of the terminal MSA on the packet-switched network, e.g. the IP address $IP_A$ assigned to MSA and/or the SIP URI of user A. Other information related to the establishment of the multimedia session is also typically included in the SIP INVITE signaling message (e.g. type of media to be used, protocol, communication port to be used, etc). The SIP INVITE message practically corresponds to an inviting message to the remote user for beginning a multimedia session. The IMS/SIP core performs, in particular, a resolution of the address of user B included in the SIP INVITE message, in order to determine the corresponding IP address $IP_B$ assigned to his/her terminal MSB. Once the resolution has been performed, the SIP INVITE message is forwarded (403) to the terminal MSB. A prompt (404) may be explicitly shown to user B on the screen of its terminal MSB, requesting user B to accept the share video session (or generally the multimedia session). During address resolution a SIP 100 TRYING (405) response can be sent by the IMS/SIP core to the terminal MSA, indicating that the SIP INVITE has been received and that the proxy or proxies included in the IMS/SIP core is/are working to route the SIP INVITE message to the destination.

In a manner analogous to what happens during a normal signaling related to a circuit-switched call, the terminal MSB sends a response addressed to terminal MSA, indicating that the terminal MSB has received the SIP INVITE message and is "ringing" (an actual ring of terminal MSB can be skipped, especially if user A and user B are already involved in a voice communication over a parallel already established connection), i.e. it is waiting for the acceptation of the share video session by user B. To this purpose, a SIP 180 RINGING message (406) can be replied to user A from the terminal MSB (e.g. using the SIP URI as identifier of user A). The SIP 180 RINGING message is forwarded from IMS/SIP core to terminal MSA (407), possibly after address resolution, to determine the IP address $IP_A$ assigned to the terminal MSA of user A. An audible or visible alert can be optionally shown (408) to user A, for informing user A that user B has received the share video invitation and that the network is waiting his/her response.

When user B accepts (409) the share video session (this step can be performed automatically by the terminal MSB, i.e. without the necessity of an actual interaction by user B with the terminal MSB), a SIP 200 OK message is sent (410) by terminal MSB, addressed to terminal MSA, as positive acknowledgement of the original SIP INVITE message 402, 403. The SIP 200 OK message is forwarded (411) by the IMS/SIP core to the terminal MSA, possibly after address resolution. An audible or visible alert can be optionally shown (412) to user A, for informing user A that user B has accepted the share video invitation. The terminal MSA acknowledges reception of the SIP 200 OK message by sending a SIP ACK message (413) to user B, that is forwarded (414) by the IMS/SIP core to the terminal MSB, possibly after address resolution. The video sharing session is thus established, so that the video frames (e.g. captured from a video camera embedded in the terminal MSA) can be sent from terminal MSA to terminal MSB. A suitable protocol for managing the sending of the video content may be the RTP/RTCP (Real Time Protocol/Real Time Control Protocol), by which a streaming of the video content is performed.

Other signaling flows can be used for establishing the multimedia session. For example, other signaling flows may comprise additional acknowledgements (e.g. a so called "provisional acknowledgement", or SIP PRACK, of the SIP 180 RINGING message) to allow the negotiation of the quality of service (QoS) on the packet-switched connection, and/or the provision of additional messages exchanged between terminal MSA and MSB for the purpose of signaling session progress, as well as related acknowledgements, during establishment of the multimedia session. In preferred embodiments, exchange of capability information between the terminals MSA and MSB may precede the starting of the SIP INVITE message. Exchange of capability information may be performed by signaling messages (e.g. SIP OPTIONS messages) adapted to assess at least one media capability of the remote user terminal. Teachings from the above mentioned patent application WO 2005/027460 can be adapted to the present invention for the purpose of capability information exchange.

In any case, the starting of the establishment of the multimedia session corresponds with the sending, from one user's terminal, of a signaling message that can be interpreted as an intention to establish a multimedia session with the remote user's terminal. In the exemplary flows described above, the intention to establish a multimedia session can be assessed by the sending of a message inviting to the multimedia session (e.g. a SIP INVITE message) and/or from a message sent for capability information exchange purposes (e.g. a SIP OPTIONS message). The intention of establishing the multimedia session can be "tracked" by the software for the control and/or management of a multimedia session running on the users' terminals, which can be triggered by the sending and/or reception of an inviting message or of a capability information exchange message. Furthermore, the establishment of the multimedia session corresponds with the reception, by both users' terminals of positive acknowledgements related (directly or indirectly) to previous messages inviting to the multimedia session. In the example of FIG. 4, terminal MSA assesses that a multimedia session is established with terminal MSB at the reception of the SIP 200 OK message 410, 411, i.e. at the reception of a positive acknowledgement of the originally sent SIP INVITE message 402, 403. In its turn, terminal MSB assesses that a multimedia session is established with terminal MSA at the reception of an acknowledgement of its own acceptation to the multimedia session inviting message, i.e. at the reception of the SIP ACK message 413, 414 shown in FIG. 4. The establishment of the multimedia session can be "tracked" by the software for the control and/or management of a multimedia session running on the users' terminals, which can be triggered by the above mentioned acknowledgements.

The Applicant has verified that the time interval occurring between the instant in which the first signaling intended to establish the multimedia session (possibly including capability information exchange) is sent by and/or received at the terminals involved in the communication, and the instant in which the acknowledgement of the establishment of the multimedia session is received at the same terminals, can last several seconds. In particular, the more the exchanged signaling messages, the more the needed time interval.

The Applicant has observed that this time interval could be exploited for preparing the terminals involved in the communication to be ready to exchange the content once the multimedia session is established. To this purpose, the running of the multimedia application software resident in the terminals involved in the communications is started before the actual establishment of the multimedia session. Preferably, the running of the multimedia application software is started at the involved terminals after the sending and/or the receiving of a signaling message intended to establish the multimedia session (possibly including a capability information exchange message). More preferably, the running of the multimedia application software is started at the involved terminals based on the sending and/or the receiving of a signaling message intended to establish the multimedia session (possibly including a capability information exchange message), i.e. using as a trigger the starting of said signaling.

In particular, in case the multimedia application software resident on the terminal is organized so that a multimedia engine module (or modules) is configured for controlling the multimedia resources of the terminal, and a separate multimedia console module (or modules) is configured for reproducing the multimedia content, it may be preferably provided that the multimedia engine module is run before the actual establishment of the multimedia session, whereas the multimedia console module is run after the establishment of the multimedia session.

To the above purposes, the running of the multimedia engine module can be triggered by the sending and/or the reception of a signaling message intended to establish the multimedia session (including a capability information exchange message), whereas the running of the multimedia console can be triggered by the reception of the final acknowledgement that the multimedia session is established.

Alternatively, in case a single software application object is used for controlling the multimedia resources of the terminal and for reproduction of the multimedia content, it may be provided that such single software application object is run in background on the user's terminal before the actual establishment of the multimedia session, to leave space on the terminal's screen for possible messages shown to the user related to the progressive establishment of the multimedia session. Such application can be then put in foreground after the actual establishment of the multimedia session. The initial running in background can be triggered by the sending and/or the reception of a signaling message intended to establish the multimedia session (including a capability information exchange message), whereas the running in foreground can be triggered by the reception of the final acknowledgement that the multimedia session is established.

Advantageously, the time interval needed for the completion of the establishment of the multimedia session can thus be exploited in order to load into the memory used by the CPU (e.g., a cache memory) of the terminal at least the modules of the multimedia application software needed for preparing the terminal to the multimedia session, so that at the actual establishment of the multimedia session the terminal is practically ready to send and/or receive multimedia content, without any further delay. This may significantly speed up the overall setup time of the multimedia service as perceived by the user. In case the establishment of the multimedia session is aborted, signaling messages advising of the session failure (e.g. SIP 4xx messages) can be used as triggers for closing of the running multimedia application module or modules, with the consequent release of the allocated memory resources.

In preferred embodiments, using a multimedia engine comprising different component modules (e.g. DLLs), each being dedicated to a respective multimedia resource of the terminal, and a multimedia supervisor module for coordinating and configuring the component modules, the supervisor can be pre-loaded into the memory of the terminal, together with the suitable number of component modules to be used in the multimedia session, before the actual establishment of the multimedia session. This can be performed, for example, by providing that the multimedia supervisor module initially pre-loads all the available component modules, then closing the component modules unnecessary for the multimedia session (thus releasing the allocated memory resources thereof), as a result, e.g., of a capability exchange information session with the remote terminal.

In order to further save processing time, it may be convenient to embed at least the multimedia engine module within the same application object adapted for controlling/managing the setup of the multimedia session, so that the multimedia engine module and the module (or modules) adapted to the control/management of the signaling messages needed for the setup of the multimedia session share the same process in the terminal's memory.

Particularly in case of a video sharing session in which a circuit-switched connection is used for the transport of the audio and a packet-switched connection is used for the transport of video content, a further reduction of the overall time needed for the setup of the video sharing service can be obtained by reducing the size of the buffer used by the multimedia application (particularly by the multimedia engine module) running on the terminal. In common multimedia sessions, the buffering operations are regulated in order to absorb audio-video fluctuations due to bandwidth fluctuations on the packet-switched connection. Indeed, in a video sharing service according to the above audio continuity is substantially guaranteed by the circuit-switched connection, so that buffer reduction may at most cause some interruptions in the video content flow, which can be considered acceptable. Suitable buffers can be thus sized for being lower than about three seconds, preferably lower than about two seconds (e.g. one second).

By operating according to what disclosed above, the overall setup time of a multimedia session between two users, i.e. the time elapsing between the instant in which the first user "Invites" the second user to the multimedia session and the instant in which the second user begins to actually share the multimedia content on its terminal's screen may be substantially reduced.

Although the operations have been disclosed and described by way of some embodiments, it is apparent to those skilled in the art that several modifications to the described embodiments, as well as other embodiments of the present invention are possible without departing from the scope thereof as defined in the appended claims.

For example, in case of a combinational service, when the user sending a content on the packet-switched connection decides to stop the content sending, the multimedia session could be closed (e.g. by using a SIP BYE message), still maintaining the connection to the packet-switched domain of the communications network opened. At the end of the multimedia session, it could be convenient to maintain at least the multimedia engine module loaded in the terminal's memory for a possible occurrence of a further multimedia session, particularly in order to save terminal's battery resources.

As another example, in case of a combinational service, when one of the users decides to terminate the voice call on the circuit-switched domain, upon reception of the acknowledgment of the drop of the connection on the circuit-switched domain the application controlling/managing multimedia session on the terminal which is closing the communication may automatically start the drop of the connection also on the packet-switched domain (e.g. by using a SIP BYE signaling message). The same procedure can also be applied in case of termination of the call on the circuit-switched domain for lack of radio coverage (in case of use of mobile terminals). In such cases, the multimedia application is closed, so as to release the previously reserved memory resources.

The invention claimed is:

1. A method for establishing a multimedia session between a user and a remote user of a communications network, the method comprising:
    sending, by a terminal of the user, a signaling message intended to establish the multimedia session with a terminal of the remote user;
    triggering, upon the terminal of the user sending the signaling message, running of at least one module of a multimedia application in the terminal of the user, the multimedia application being used in the multimedia session; and
    receiving, by the terminal of the user, a predetermined acknowledgement indicative of an establishment of the multimedia session.

2. The method according to claim 1, wherein the signaling message is addressed to the remote user.

3. The method according to claim 1, wherein the signaling message includes a capability exchange message configured to assess at least one media capability of the terminal of the remote user.

4. The method according to claim 1, wherein the signaling message includes an inviting message configured to invite the terminal of the remote user to the multimedia session.

5. The method according to claim 1, further comprising placing a call to the terminal of the remote user.

6. The method according to claim 5, further comprising:
    receiving an acknowledgement to said call; and
    establishing a connection on a packet-switched domain of said communications network based on the reception of the call acknowledgement.

7. The method according to claim 6, wherein the sending of the signaling message is started upon the established packet-switched connection.

8. The method according to claim 1, wherein the running of said at least one module of said multimedia application is performed in background.

9. The method according to claim 1, wherein said multimedia application comprises a multimedia engine and a multimedia console, and wherein the running of said at least one module of said multimedia application comprises running said multimedia engine.

10. The method according to claim 9, wherein the receiving of said predetermined acknowledgement comprises receiving a positive acknowledgement of the establishment of the multimedia session, and wherein the method comprises running in foreground said multimedia console after reception of said positive acknowledgement.

11. The method according to claim 10, wherein the running in foreground of said multimedia console is performed based on the reception of said positive acknowledgement.

12. A non-transitory computer readable medium comprising software code portions, which, when executed by a processor, perform:
- sending, by a terminal of a user, a signaling message intended to establish a multimedia session with a terminal of a remote user;
- triggering, upon the terminal of the user sending the signaling message, running of at least one module of a multimedia application in the terminal of the user, the multimedia application being used in the multimedia session; and
- receiving, by the terminal of the user, a predetermined acknowledgement indicative of an establishment of the multimedia session.

\* \* \* \* \*